LATCHING CIRCUIT

Filed Dec. 30, 1960

*INVENTOR.*
HENRY R. FOGLIA

*BY* Roy C. Hopgood

ATTORNEY

United States Patent Office 3,199,087

Patented Aug. 3, 1965

3,199,087

LATCHING CIRCUIT

Henry R. Foglia, North White Plains, N.Y., assignor to International Business Machines Corporation, New York, N.Y., a corporation of New York Filed Dec. 30, 1960, Ser. No. 79,594

10 Claims. (Cl. 340—173)

This invention, generally, relates to latching circuits and, more particularly, to a circuit which is operable selectively at different stable states of current flow.

It is well known in solid state physics that most insulating materials (or poor conductors of electricity) exhibit an increased electrical conductivity (a decrease in resistance) at elevated temperatures. This property is particularly true of such semiconductor materials as germanium or silicon which have a negative coefficient of resistivity in that the electrical resistance of such materials decreases when the materials are excited thermally.

Accordingly, it is an object of the invention to provide a circuit arrangement employing such materials to obtain multiple states of resistivity operation.

It is another object of the invention to provide a circuit arrangement embodying thermally responsive means having a negative coefficient of resistivity for operation in two stable states.

A further object of the invention is to provide a circuit arrangement employing a semiconductor device in a particular resistivity relationship with a load resistance, so that the arrangement may operate in either of two stable states of power consumption by the device, dependent on the circuit energization and thermal response of the device.

A more specific object of the invention is to provide a trigger circuit arrangement including thermally responsive means having a negative coefficient of resistivity.

These and other objects are achieved by construction of a circuit according to this invention, wherein a thermally responsive device is provided having a negative coefficient of resistivity, such that under one temperature condition, the device exhibits first conductivity characteristics and under a second self-sustaining temperature condition, the device is latched into a state having second conductivity characteristics. Means is provided to energize the device for operation at said one temperature condition, the device being adapted to operate at said second self-sustaining temperature condition in response to a momentary change in conductivity induced by a separate means whereby the power dissipation in said device is increased and the heat provided thereby being sufficient to sustain the operation of said device at said second self-sustaining temperature condition. In operation, therefore, the power consumption of the device is at one level when under the first temperature condition corresponding to a first state of operation, and after the device is excited thermally by an external source, self-sustaining heat generation causes the power consumption of the device to remain at a second level, corresponding to a second state of operation, even though the external thermal exciter is rendered inoperative.

The foregoing and other objects, features and advantages of the invention will be apparent from the following more particular description of a preferred embodiment of the invention, as illustrated in the accompanying drawings.

Figure 1:
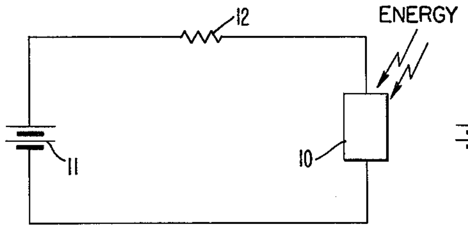
FIG. 1 is a circuit diagram showing a device having a negative coefficient of resistivity for stable operation in two different states to illustrate the principles of the invention.

Referring now to FIG. 1, a device having a negative coefficient of resistivity is indicated at 10. While the device 10 may be energized by any suitable means, it is shown connected in a series circuit with an electrical power source 11, such as the battery for example; and a load resistor 12, whose resistivity is either constant or increasing with an increase in temperature is used as a current limiter. Although the power source is shown as a battery, it should be noted that it can be either a direct current power source or an alternating current power source.

The arrows directed at the device 10 are intended to indicate energy rays from an external source of radiation (not shown) which are utilized to excite the device 10 thermally. As will be more fully explained hereinafter, these radiation rays may be electromagnetic rays, short wavelength rays, such as gamma, beta or X-rays, or heat rays.

As stated previously, the device 10 has a negative coefficient of resistivity and is a relatively poor conductor of electricity at room or ambient temperature. Upon an increase in temperature, the device becomes a semiconductor since the characteristics of conductivity are dependent on the operating temperature of the device. A specific relationship of resistivity between the device 10 and the load resistor 12 is selected so that, under initial operating conditions when the ambient temperature of the device is at room temperature, the resistance of the device 10 is substantially greater (of the order of 100 times greater) than the resistance of resistor 12.

When the circuit is energized by the battery 11, the current flowing in the circuit may be expressed as follows:

$$I=\frac{E_{11}}{R_{12}+R_{10}} \qquad (1)$$

where I is the current flowing in the circuit, $E_{11}$ is the voltage provided by the battery 11 and R is the value of resistance of the element indicated by the numeral.

Since the resistance of the device 10 is substantially greater than the resistance of the resistor 12 at room or ambient temperature, it is readily apparent that the flow of current in this state of operation is determined primarily by the resistance level of the device 10, and the resistor 12 has little effect on the current flow. This resistance level is indicated on the negative coefficient of resistivity curve (FIG. 2A) at the point $T_1$.

During this first state of circuit operation, the power drawn by the device 10 may be expressed as follows:

$$P_{10}=\frac{E_{11}^2R_{10}}{(R_{10}+R_{12})^2}=\frac{IR_{10}}{R_{10}+R_{12}} \qquad (2)$$

where $P_{10}$ is the power dissipated by the device 10. It is obvious that the resistance of the resistor 12 has little effect on the power drawn by the device 10 during the initial temperature condition, and in fact, it may be ignored for practical purposes. The relationship of the power vs. resistivity for the device 10 is shown in FIG. 2B, and the power at the initial resistance value is indicated at the point $P_1$.

Now with the circuit described above in operation, assume that the ambient temperature of the device 10 is increased by, for example, irradiating the device from an external source. An increase in temperature increases the conductivity of the device 10; that is, the resistance of the device 10 decreases. The current flow through the circuit is determined again by Equation 1 above, and it is obvious that the resistance value of the resistor 12 has a greater effect on the level of current flow as the ratio of the resistances decreases.

Similarly, the power drawn by the device 10 increases until $R_{10}=R_{12}$. When this occurs the peak value of the curve of FIG. 2B is obtained.

Thereafter, the resistance of the device 10 decreases with increasing temperature until a level is reached where the device 10 generates an amount of heat equivalent to that which it dissipates. This point is indicated in FIG. 2A for illustrative purposes at $T_2$, and in like manner, the power drawn by the device 10 is indicated in FIG. 2B at $P_2$.

Figure 2A:
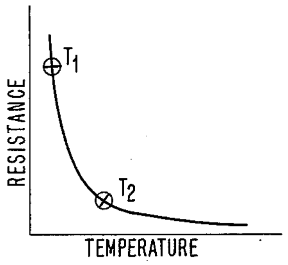
FIG. 2A is a graph illustrating the negative coefficient of resistivity characteristic for the device utilized in the circuit of FIG. 1.
Figure 2B:
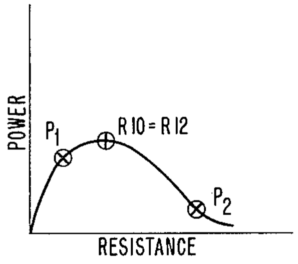
FIG. 2B is a graph illustrative of the power consumed by the thermally responsive device vs. its resistivity under two operating conditions.

At the points $T_2$ and $P_2$ of FIGS. 2A and 2B, respectively, an operating point occurs at which the operation is self-sustaining, so that the external source of radiation may be removed or rendered inoperative, and the circuit continues to operate at this point. Although this state of operation is shown and described as a specific point, it should be noted that the occurrence of this condition is not limited to this point exactly, but rather, it may occur in the immediate vicinity as will be determined by circuit characteristics.

It is readily apparent from the above description, that a relationship exists between the power drawn by the device 10 and its ambient operating temperature. This relationship may be expressed as follows:

$$P_{10}=\alpha T^4 \qquad (3)$$

where $\alpha$ is the constant of proportionality, and T is the temperature of the device 10. The value of $\alpha$ depends on the mounting of the device 10; that is, the baffling or heat sink arrangement which controls the dissipation of heat from the device.

Figure 2C:
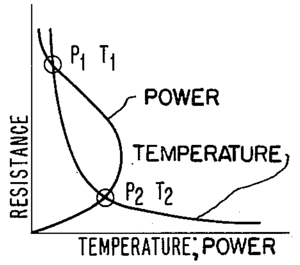
FIG. 2C is a composite graph of FIGS. 2A–B indicating the power and resistivity levels at which the self-sustaining states of operation are achieved.

A composite curve (FIG. 2C) may be plotted for the curves of FIGS. 2A and 2B. The curves must intersect at two distinct points, and these points are indicative of the separate stable states of circuit operation.

After the low resistance value of the device 10 is achieved by thermal excitation, the thermal excitation is removed or rendered inoperative, so that the device 10 is self-sustaining. The circuit continues to operate in this state until the device 10 is acted upon to change its resistivity such as, for example, by interrupting the current flow in the circuit. This change of state may take place also by cooling the device 10, thereby increasing its resistivity and decreasing its conductivity to lower the power drawn by it.

The above described circuit arrangement may be modified within the principles of the invention to provide other and various circuits for performing specific functions. One such specific circuit embodying these inventive concepts is shown in FIG. 3 to operate as a triggering circuit.

Figure 3:
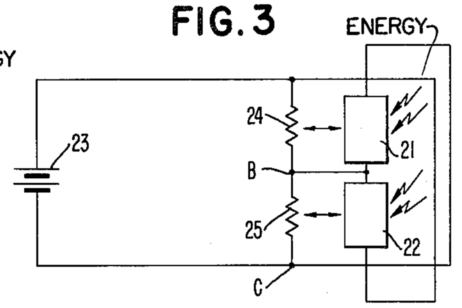
FIG. 3 is a diagram of a trigger circuit embodying the principles of the invention.

As shown in FIG. 3, the devices 21–22 are identical temperature sensitive resistors having a negative coefficient of resistivity, so that when excited thermally, their resistance values decrease. The devices 21–22 are connected in a circuit with a battery 23 and substantially equal linear resistors 24–25 which are utilized as heaters, as will be explained.

Assume initially that there is no battery power supplied to the circuit; then the resistance of the devices 21–22 is substantially greater than the resistance of resistors 24–25. Now when the circuit is energized by the battery 23, equal amounts of power are generated by each of the resistors 24–25.

Due to the close physical proximity of resistor 24 to device 21 and resistor 25 to device 22, the power generated by the resistors 24–25 heats the devices 21–22, respectively, so that the resistance values of the devices 21–22 decrease as a result of the increase in temperature. The current flow in resistor 24 is distributed between resistor 25 and device 21. When resistor 24 is heated, the resistance of device 21 decreases. This causes more current to flow from source 23 through device 22, causing its resistance to decrease. This process continues until the filter equilibrium condition occurs in the circuit; that is, the temperature of the devices 21–22 is substantially constant and equal.

If rays from an external source of radiation (not shown) are thereafter applied to the device 21, for example, its temperature is raised to a point above that of the device 22. This increase in temperature reduces the resistance of the device 21, and since this device also shunts the resistor 25, the total resistance is also reduced between the points indicated as B–C in FIG. 3.

As a result, the voltage across the resistor 24 and thus the power generated by it are increased. The increased power of the resistor 24 further raises the temperature of the device 21, lowering, in turn, the voltage across the points B–C and increasing both the voltage and power across the points A–B.

This flip-flop action continues until an equilibrium condition sets in even after the external radiation source for triggering the circuit has been removed. The equilibrium condition thus obtained is one in which the resistance of the device 21 assumes a value such that the power absorbed by it is just sufficient to sustain the power radiated by the resistor 24.

The circuit may be switched by supplying additional heat to the device 22 to change the equilibrium state of the two devices. Switching also may be accomplished by the removal of heat from one of the elements, e.g., by cooling. The cooling may be done by blowing air on the device or, better still, by using a thermocouple as an electronic refrigerator. A still further way of accomplishing this it to inject a voltage in series with one of the devices 21–22 to increase or decrease the current and, therefore, the power or heat in one of them.

Figure 4:
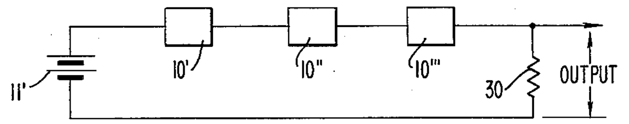
FIG. 4 shows a further arrangement for use of the device of the invention in a logic circuit.

The external source of radiation for providing thermal excitation of the device 10 of FIG. 1, or the devices 21–22 of FIG. 3 may be a source of heat radiation, electromagnetic radiation or short wavelength radiation, such as beta, gamma or X-rays. In addition, however, the device 10 may be excited even by an electron beam, and if desired, a device 10 may be mounted within a cathode ray tube in the path of an electron beam. A still further example of an exciting means for a device 10 is a ray or beam of light or other frequency source. Such a latching device as described above is uniquely adapted for use in a wide variety of situations. For example, as shown in FIG. 4 of the drawings, an AND circuit is developed by connecting two or more of the devices 10 in series with each other, such as the devices 10′, 10″ and 10‴ in FIG. 4. While these devices 10′, 10″ and 10‴ may be energized by any suitable source, they are connected in this instance in series with a voltage source 11′ and a current limiting or load resistor 30.

At a first or ambient temperature, the high resistance of each latching device 10′, 10″ and 10‴ permits a relatively small current to flow through the resistor 30, and therefore, a first relatively small output voltage is developed across the resistor 30. However, as each of the devices responds separately to an external energizing source, it latches into its respective second state, as described previously, permits a larger current to flow.

As each device 10′, 10″ and 10‴ is switched, the current flow through the resistor 30 is increased, and each increase in current flow is reflected by an increase in the voltage output. Of course, it is understood that by connecting the devices 10′, 10″ and 10‴ in parallel with each other, the resulting arrangement will function as an OR circuit.

Figure 5:
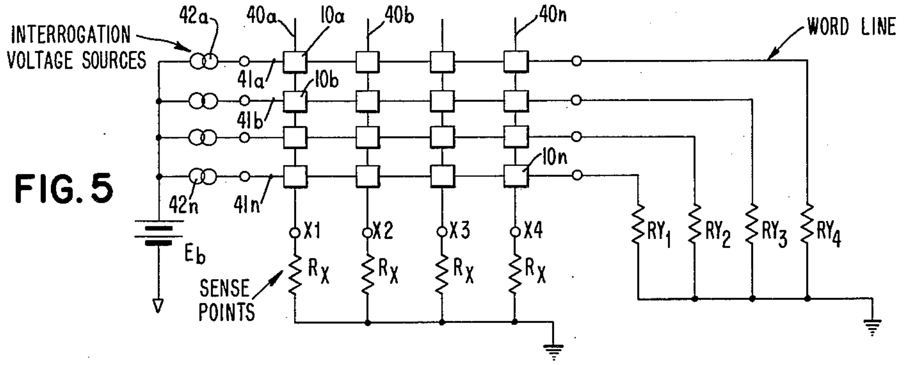
FIG. 5 shows a still further arrangement for use of the device of the invention in a Read Only Memory circuit.

The device of the invention is adapted to be combined with similar devices to provide a memory circuit such as illustrated by the Read Only Memory circuit shown in FIG. 5 of the drawings. Referring now to FIG. 5, one of the devices 10*a*, 10*b*, . . . 10*n* is connected at each intersection between two orthogonal, electrically conductive lines 40*a*, 40*b*, . . . 40*n* and 41*a*, 41*b* . . . 41*n*. An energizing source $E_b$ is common to all of the devices and is similar in operation to the source 11 shown in FIG. 1.

In operation, information is written into selected ones of the devices, for example, devices 10*a* and 10*n*, by exciting these devices, causing them to switch conductive states. These devices will retain the conductive states into which they are switched due to the self-sustaining action described previously.

To read information stored in the memory, a word line is interrogated by the application of a voltage 42*a* in series to the word line 41*a* and also to the other word lines. All of the devices 10*a*, 10*b*, . . . 10*n* which have been set (or excited or switched) will provide electrically conductive paths out through the sense resistors $R_x$, and a voltage is developed which is dependent directly upon the number of devices switched.

For example, if only the devices 10*a* and 10*n* are conductive, a voltage is sensed across only the $R_x$ in series with the lines 40*a* and 40*n*. The magnitude of the sensed voltage will be indicative of the number of devices in that line which have been switched.

This circuit in FIG. 5 is presented merely as an illustration of one form of a utilization circuit to employ a device in accordance with the basic inventive concept. Other and different circuits will occur to those skilled in this art in view of this description.

Figure 6:
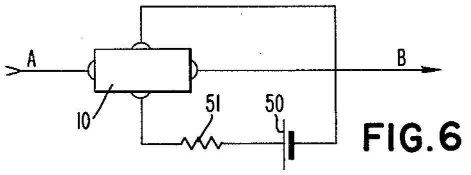
FIG. 6 shows a circuit connection for the device of the invention to operate as a voltageless relay.

A still further use to which the device of the invention is adapted is seen in FIG. 6 of the drawings. As explained previously, the device 10 has relatively high resistance at normal ambient temperature, and therefore, there will be practically a zero voltage gradient between the points A and B for this condition.

However, with an excitation source 50 and an impedance 51 connected in series with the device 10 as shown in FIG. 6, the device 10 will be rendered conductive when it is switched to its more conductive state as explained previously.

While the foregoing description sets forth the principles of the invention in connection with specific apparatus, it is to be understood that this description is made only by way of example and not as a limitation of the scope of the invention as set forth in the objects thereof and in the accompanying claims. For example, the application of the principles described with respect to this invention have only been applied to a trigger circuit. It is to be understood that a thermally responsive device, having the described property, may also be utilized in a circuit arrangement as a thermo-switch, or thermo-amplifier, or in various types of thermally responsive logic circuits.

While the invention has been particularly shown and described with reference to preferred embodiments thereof, it will be understood by those skilled in the art that various changes in form and details may be made therein without departing from the spirit and scope of the invention.

What is claimed is:

1. A latching circuit comprising first and second resistance means serially connected, means for energizing said first and second resistance means, said first means being semiconductive and having a region when energized exhibiting a first level of conductivity at a given ambient temperature and a second higher level of conductivity at a different ambient temperature, said region having substantially linear conductivity variation, said second means having a higher conductivity than said first means at said given ambient temperature, and said first means responding to external irradiation, so that said circuit is latched into a self-sustaining state of operation by the heat dissipation of said first means when said different ambient temperature is achieved, said first means being operated within said region, said first and second temperatures being within the said linear conductivity variation region, and means for insulating said first means to maintain an equilibrium state between the heat generated by said first means and the heat dissipated by it when said circuit is latched into said self-sustaining state of operation.

2. A latching circuit comprising thermally responsive means having a region exhibiting a negative coefficient of resistivity to define a first state of conductivity at a first ambient temperature and a second state of higher conductivity when subjected to a second higher ambient temperature, said region having a substantially linear variation in conductivity between said first and second states, impedance means serially connected to said thermally responsive means and having a predetermined resistivity relationship with said thermally responsive means at said first ambient condition, means for energizing both of said means, so that said circuit operates with said thermally responsive means exhibiting said first state of conductivity, said thermally responsive means being operated solely within said region and means for exhibiting said linear variation in conductivity, irradiating said thermally responsive means to obtain said second higher ambient temperature whereupon said thermally responsive means is latched into said second state of conductivity, so that when the irradiating means is rendered inoperative said circuit is adapted to be self-sustaining at said second state of conductivity of said thermally responsive means.

3. The circuit of claim 2, wherein the resistivity of said thermally responsive means is substantially greater than that of said impedance means at said first ambient temperature.

4. The circuit of claim 3, and further comprising means for insulating said thermally responsive means to maintain an equilibrium state between the heat generated by said means and the heat dissipated by it when said circuit is latched into said self-sustaining state of operation.

5. The circuit of claim 2 including a second thermally responsive means connected in series with said first mentioned thermally responsive means to operate as an AND circuit.

6. The circuit of claim 2 including a plurality of additional thermally responsive means connected in series with said first mentioned thermally responsive means to operate as an AND circuit.

7. The circuit of claim 2, wherein said thermally responsive means comprises first and second substantially identical devices serially connected and said impedance means comprises first and second substantially equal resistors serially connected together and proximately positioned with respect to said first and second devices respectively, said first resistor shunting said second device and said second resistor shunting said first device, so that when energized an equilibrium condition is obtained between said first and second devices at said first ambient temperature indicative of said first conductivity condition, said second conductivity being obtained when one of said devices is thermally excited by the irradiating means to latch the irradiated device into said second ambient temperature.

8. In a memory device having a first and a second plurality of electrically conductive lines arranged orthogonally, a latching device connected with predetermined ones of said lines at each intersection, an energizing source common to all of said latching devices, means to apply an interrogating voltage to selected ones of said first plurality of electrically conductive lines, and means to connect a sensing means to said second plurality of electrically conductive lines to sense a change in conductivity, each latching device comprising an element having a region exhibiting a first conductivity state at one ambient temperature and a higher conductivity state at a higher ambient temperature, said element having a substantially linear conductivity characteristic throughout said region, means to energize said element, and said element being capable of changing its conductivity in response to a momentarily applied additional energy to dissipate power in said element is changed and the heat provided thereby is sufficient to maintain said element in said changed state of conductivity, said element being operated within said region.

9. A circuit having two stable states of operation comprising a semiconductive element having a region of operation in which the resistance decreases substantially linearly with the operating temperature thereof and having two operating temperatures corresponding to said two stable states, said two stable states falling within said region, means to operate said element being operated within said linear region, said element being responsive to external energy to vary the resistance thereof, an impedance coupled to said element and defining an electrical circuit, said circuit having a power dissipation resistance characteristic which has a maximum power dissipation between said two stable states, and electric source means coupled to said circuit to produce an electrical current through said element.

10. A circuit having two stable states of operation comprising an element having a substantially linear region of operation in which the resistance decreases with the operating temperature thereof and having two operating temperatures corresponding to said two stable states, said two stable states falling within said region, said element being operated within said region, external energy means coupled to said element to vary the thermal excitation thereof, an impedance coupled to said element and defining an electrical circuit, said circuit having a power dissipation resistance characteristic which has a maximum power dissipation between said two stable states, and electric source means coupled to said circuit to produce an electrical current through said element.

References Cited by the Examiner

UNITED STATES PATENTS

| | | | |
|---|---|---|---|
| 1,972,112 | 9/34 | Rypinski | 323—68 |
| 2,614,140 | 10/52 | Kreer | 307—88.5 |
| 2,832,897 | 4/58 | Buck | 340—173.1 |
| 2,980,808 | 4/61 | Steele | 307—88.5 |

IRVING L. SRAGOW, *Primary Examiner.*